G. S. BERGERUD.
HAY LOADER.
APPLICATION FILED JAN. 23, 1918.
1,306,462.
Patented June 10, 1919.
3 SHEETS—SHEET 2.
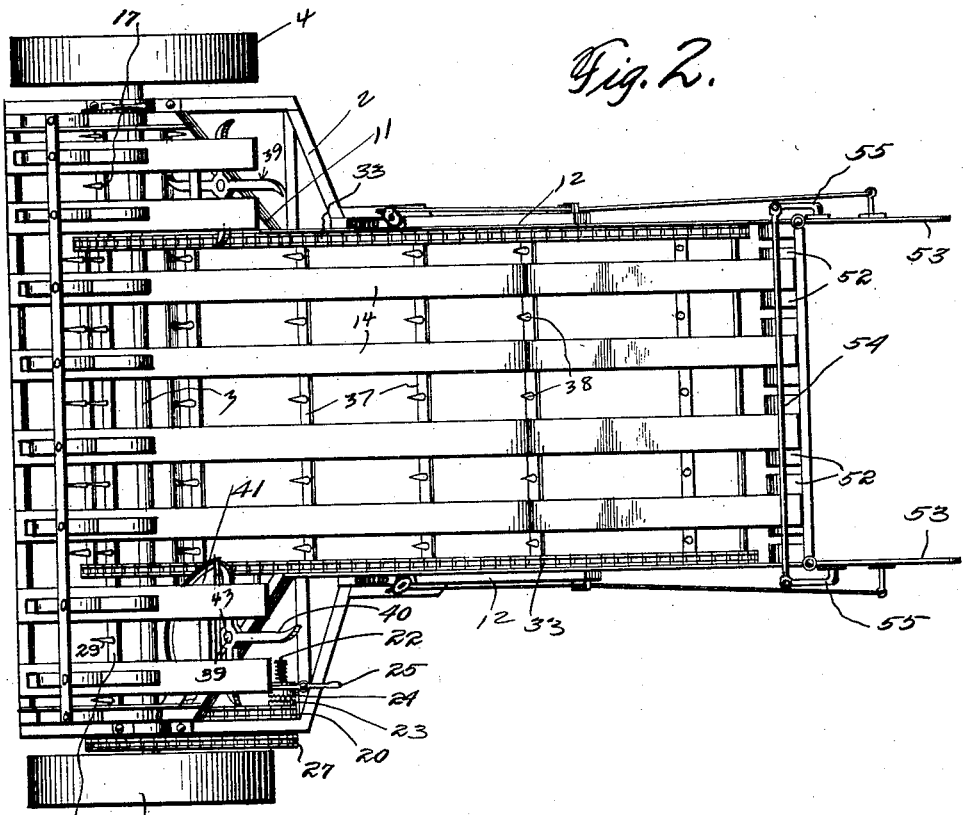
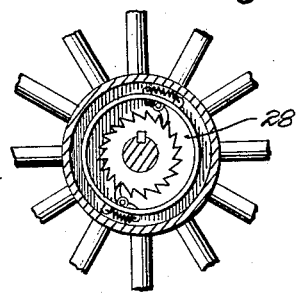
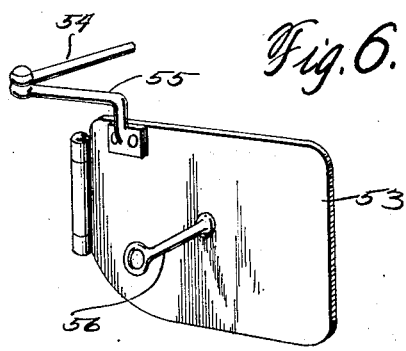
Witnesses
Inventor
G. S. Bergerud
By
Attorneys

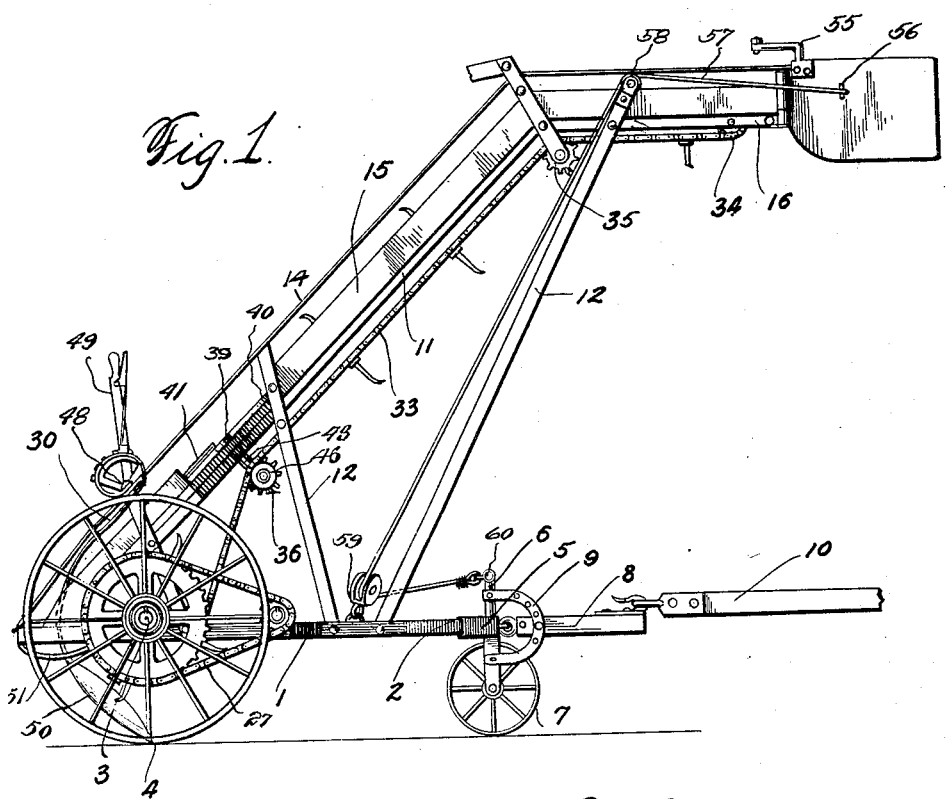

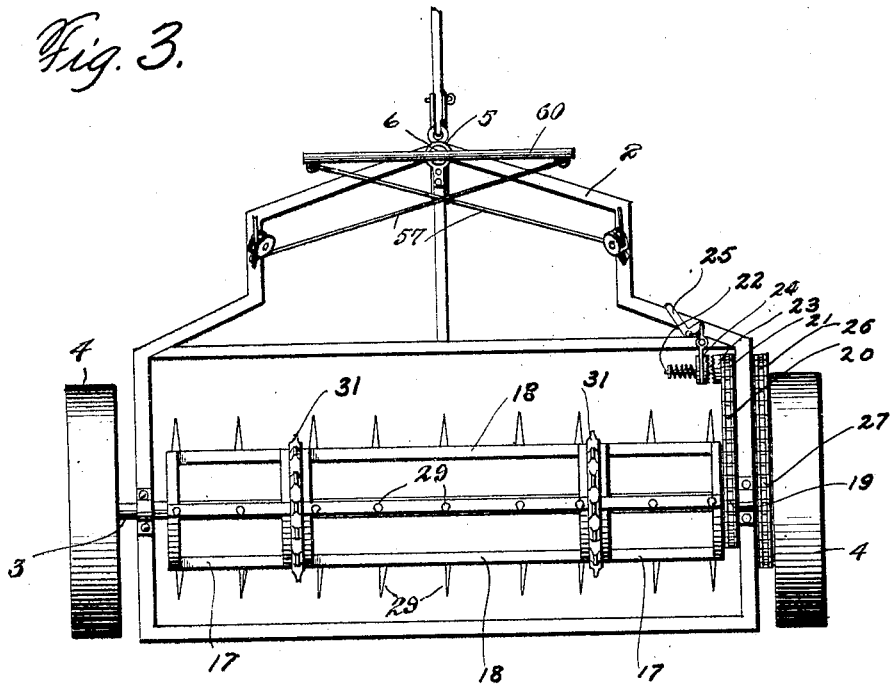
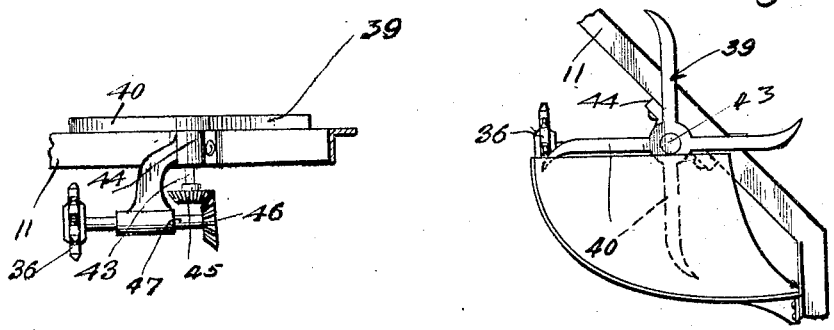

UNITED STATES PATENT OFFICE.

GILBERT S. BERGERUD, OF FERGUS FALLS, MINNESOTA.

HAY-LOADER.

1,306,462.  Specification of Letters Patent.  Patented June 10, 1919.

Application filed January 23, 1918. Serial No. 213,379.

*To all whom it may concern:*

Be it known that I, GILBERT S. BERGERUD, a citizen of the United States, residing at Fergus Falls, in the county of Otter Tail, State of Minnesota, have invented certain new and useful Improvements in Hay-Loaders; and I do hereby declare the following to be a full, clear, and exact description of the invention, such as will enable others skilled in the art to which it appertains to make and use the same.

This invention relates to hay loaders.

The object of the invention is to provide a hay rake which will take the hay up from a comparatively wide path of movement, and not only elevate it but contract it to the wagon body width as it is carried upwardly for dumping onto the load.

With the above object in view, and such others relating to the details of construction, as may hereinafter appear, my invention will now be fully set forth and described, reference being had to the accompanying drawings.

In the drawings:—

Figure 1 is a side elevation of the loader, one of the guards being removed,

Fig. 2 is a plan view thereof,

Fig. 3 is a plan view of the running gear, the elevating mechanism being removed, Fig. 4 is an enlarged detail elevation of a condensing device, with the guard removed, Fig. 5 is a plan view thereof, with the guard in place, Fig. 6 is a detail view of a chute adjusting mechanism, Fig. 7 is a detail view of the wheel clutch, and Fig. 8 is a transverse section through the elevator structure.

Referring more particularly to the drawings, 1 represents a horizontal rectangular frame which terminates in a forwardly projected triangular portion 2. The frame 1 is supported by an axle 3 upon which the drive wheels 4 are fixed. The apex of the triangular portion 2 terminates in a bearing 5 within which the vertical steering head or spindle 6 operates, the latter carrying the single steering wheel 7. Also, projected from the steering head 6 is the tongue 8 which is pivotally connected to the steering head, and may have its vertical angular position varied by adjusting it with relation to a semi-circular segment 9 which is secured to the steering post. The above mentioned adjustment makes possible the hitching of the hay rack to the reach 10 of a hay rack or wagon.

Mounted upon the horizontal frame 1, and inclining upwardly and forwardly from the rear end of the latter is an elevator frame 11 which is held in position by a suitable plurality of standards 12, and while at its lower end it extends the full width of the frame 1, above the forward end of the latter it is contracted to a width which corresponds to that of a hay wagon body. The frame 11, furthermore, is constructed of angle iron and has the intermediate longitudinal bottom slats 13 and longitudinal top slats 14, said top and bottom slats inclosing an elevator space therebetween. Steel side plates 15 extend the length of the constracted portion of the frame 1, and confine the hay which is being elevated within the elevator space. At its upper end the elevator frame 11 is continued forwardly as a horizontal platform 16, from which hay is delivered into the wagon, and the sides 15 are also continued to the front end of the extension 16.

Loosely mounted upon the shaft or axle 3 are two drums 17 which are cylindrical frames of such extent as to occupy the portions of the axle which extend beyond the lateral dimension of the contracted portion of the frame 11. The drums or cylinder frames 17 are connected to one another by means of transverse bars 18, so that they rotate together, and at one end a sprocket 19 is rigidly associated with one of the cylinders so that a chain 20 passing thereover may also surround a sprocket 21 mounted upon a counter-shaft 22 which has its bearings upon the frame 1. The sprocket 21 is loosely mounted upon the counter-shaft 22 and carries a clutch member 23 with which a slidable clutch member 24 splined upon the shaft 22 may be engaged by the manipulation of a hand lever 25. Also mounted upon the shaft 22 is a sprocket 26 which is connected to a sprocket 27 fixed upon the corresponding drive wheel 4. The train of gearing which has been described provides a means for driving the hay elevating mechanism at will, and in order to guard against the accidental operation of the hay elevating mechanism in a reverse direction, the drive wheel 4 is connected to the axle 3 through the medium of a one way clutch 28.

The connecting bars across the drums 17, directly along the peripheries of the latter are provided with prongs or teeth 29 which operate below the frame 1 and upwardly at the rear thereof between the tines of a rake 30, so as to deliver the hay which is gathered from the ground to the elevating space above mentioned. Also, the drums or cylinders 17 carry upon their inner ends sprockets 31 around which conveyer chains 33 operate. The opposite ends of the chains 33 pass over sprockets 34 mounted at the upper ends of the elevator frame, and upon their return, the lower runs of the chains pass over suitable guide sprockets 35 and 36 which extend below the frame 11. The chains 33 are connected by transverse slats 37 which, on the upper run of the chain, ride upon the longitudinal bottom slats 13, and are provided with prongs or teeth 38 which project across the elevator space toward the upper slats 14.

In order to compress the hay which is carried upon the side portion of the elevator, into the confines of the conveyer space, I provide the rotary compressing wheels 39 which operate horizontally in the angles between the wide and narrow portions of the conveyer frame. Each of the rotary compressing wheels 39 consists of a hub from which a plurality of prongs or arms 40 extends, so as to sweep over the upper surface of the frame toward the middle thereof, thus throwing the hay which has come into their reach inwardly upon the conveyer. In order to prevent the hay from clogging the wheels 39, guards 41 are mounted so as to extend over the arms 40, so that the hay will pass over the guards until it is thrown inwardly by the arms. The hubs of the wheels 39 are mounted upon vertical shafts 43, and the latter in turn are mounted in bearing brackets 44 secured to the frame. The lower ends of the shafts 43 are provided with bevel gears 45 which mesh with gears 46 secured to the horizontal stub shafts 47 whose opposite ends carry the guide sprockets 36 above mentioned, each bearing below and supporting the lower runs of the chains 33.

The rake 30 may be of any usual construction and supported upon a transverse rake bar 48 which extends across the upper edges of the side members 15 and has secured thereto a hand lever 49 by means of which the rake is raised and lowered, and locked in its positions of adjustment. The end tines of the rake 30 are provided with the guard fingers 50 which extend upwardly and rearwardly and serve as guides for the hay and prevent it from falling from the ends of the rake and becoming entangled with the drive wheels. In order to provide suitable guards for the rake teeth, wire loops 51 are extended downwardly from the lower extremities of each of the top bars 14, so that while the rake is permitted its full range of adjustment, the tines are guarded against lateral or undue longitudinal movement.

The free extremity of the horizontal portion of the elevator frame carries a plurality of inwardly projecting teeth 52 which serve to release the hay from the prongs of the conveyer, so that it may be delivered from the end of the elevator. As the hay falls from the elevator, it is delivered into the wagon body, and in order to insure its proper direction into the latter, a pair of swinging wings or chute members 53 are hinged to the ends of the vertical walls 15, and are of such extent that they project below the bottom of the horizontal portion of the elevator frame and well over the wagon body. Also, they are connected by a transverse bar 54 which is pivotally connected to crank arms 55 which rise from the upper edges of the wings 53, so that when one of the wings is swung the other will be moved correspondingly. Also extending from the sides of the wings 53 are the arms 56 to which are connected cables 57, which pass thence over pulleys 58, down along the sides of the frame 1 to pulleys 59 mounted upon the frame 1. The extremities of the cables are then connected to the ends of a steering arm 60 which is fixed to the upper end of the steering post 6. Thus, as the tongue 8 is swung to one side or the other, so as to turn the hay loader, the chute members 53 turn correspondingly so as to properly direct the fall of the hay into the wagon body.

In the operation of the above described machine, it is hitched in the usual manner to the reach 10, so that it travels behind the wagon to be loaded. The rake 30 is then lowered, and the clutch members 23 and 24 engaged so that the elevator mechanism will operate. The hay is gathered upon the tines of the rake 30 below the frame 1, and is picked up by the drums 17 and the conveyer. Finally it is entirely compressed upon the conveyer within the elevating space, and is lifted to the horizontal platform 16 from whence it is delivered from the chute members 53 into the wagon body. As already mentioned, the chute members 53 swing from side to side in accordance with the changing direction of the wagon which draws the loader, so that automatically the hay is properly delivered into the wagon, instead of falling beyond the sides of the body while the machine is being turned about.

It will be apparent from the foregoing description that I have constructed a very simple and efficient hay loader which will effectively clean a field of hay either out of the swath or windrow.

What I claim as my invention is:—

1. A hay loader, comprising in combination, a supporting frame, an inclined frame extending forwardly and upwardly from the rear end of the supporting frame, an elevator operative upon the inclined frame, a rake disposed in position to gather hay from the ground below the supporting frame and deliver it to the elevator, means at the upper end of the inclined frame for delivering the hay to one side or the other from the end of the elevator, a steering gear, and means connecting the steering gear with the means for directing the hay to one side or the other whereby the latter is automatically controlled as the steering gear is turned.

2. A hay loader including a wheeled frame, a steering gear for the frame, a hay conveying elevator, hay deflecting means at the discharge end of the elevator, said deflecting means being shiftable to deflect hay to either side of the elevator, and connections between the deflecting means and the steering gear for shifting of the deflecting means through movement of the steering gear.

In testimony whereof, I affix my signature in the presence of two witnesses.

GILBERT S. BERGERUD.

Witnesses:
ARTHUR GUSTAFSON,
CLARA BERGERUD.

Copies of this patent may be obtained for five cents each, by addressing the "Commissioner of Patents, Washington, D. C."